United States Patent [19]

Shinozawa et al.

[11] Patent Number: 5,406,481
[45] Date of Patent: Apr. 11, 1995

[54] RAINFALL, SNOWFALL FORECAST APPARATUS AND METHOD

[75] Inventors: Kazuhiko Shinozawa, Yokohama; Noboru Sonehara, Zushi; Tadasu Uchiyama, Yokosuka, all of Japan

[73] Assignee: Nippon Telegraph and Telephone Corporation, Tokyo, Japan

[21] Appl. No.: 266,541

[22] Filed: Jun. 28, 1994

[30] Foreign Application Priority Data

Jun. 30, 1993 [JP] Japan .................................. 5-160530
Aug. 30, 1993 [JP] Japan .................................. 5-213830
Nov. 2, 1993 [JP] Japan .................................. 5-274065

[51] Int. Cl.$^6$ ............................................ G06F 15/54
[52] U.S. Cl. .................................... 364/420; 395/931
[58] Field of Search ................... 364/420; 340/601; 395/22, 931

[56] References Cited

U.S. PATENT DOCUMENTS

| 4,014,019 | 3/1977 | Fetter | 342/26 |
| 5,140,523 | 8/1992 | Frankel et al. | 364/420 |
| 5,208,587 | 5/1993 | Cornman | 340/968 |

FOREIGN PATENT DOCUMENTS 4-58188  2/1992 Japan .
4-98191  3/1992 Japan .
4-335181 11/1992 Japan .

OTHER PUBLICATIONS

"Application of Grossberg and Mingolla Neural Vision Model to Satellite Weather Imagery", INNC 90 Paris Jul. 9-13, 1990, pp. 805-808.

"Experiments for a Very-short-range Prediction of Snowfall Using a Simple Weather Radar System, Part 1-Outline and Possibility-", Geophysical Bulletin of Hokkaido University, Sapporo, Japan, vol. 44, Oct. 1984, pp. 35-51.

"Experiments for a Very-short-range Prediction of Snowfall Using a Simple Weather Radar System, Part 2-Examples of Actual Prediction-", Geophysical Bulletin of Hokkaido University, Sapporo, Japan, Oct. 1984, pp. 53-65.

"A Method for Estimating the Advection Velocity of Radar Echoes Using a Simple Weather Radar System", Geophysical Bulletin of Hokkaido University, Sapporo, Japan, vol. 44, Oct. 1984, pp. 23-34.

A Weather Radar Image Prediction Method in Local Parallel Computation, Shinozawa et al., ICNN '94, pp. 1-6.

Primary Examiner—Donald E. McElheny, Jr.
Attorney, Agent, or Firm—Finnegan, Henderson, Farabow, Garrett & Dunner

[57] ABSTRACT

An apparatus is presented for providing a short time range forecast with relative high accuracy from weather radar images of cloud reflection data by incorporating physical properties of cloud in the forecasting method. The method consists of defining a plurality of lattice points on a radar image, and multiplying the reflection data from a group of neighboring lattice points obtained at a specific past point in time with selected coefficients. The products of multiplication are summed, and transformed into image data by specific function based on the properties relating to cloud. Squared errors of the difference between the computational reflection data and the observed reflection data are iterated to a value below a predetermined threshold value to select the coefficients, and these coefficients are used to provide forecasting of reflection data at a specific future point in time.

10 Claims, 10 Drawing Sheets

RAINFALL, SNOWFALL FORECAST APPARATUS AND METHOD

BACKGROUND OF THE INVENTION

1. Field of the Invention

The present invention relates to an apparatus and a method of its use for predicting rainfall.snowfall conditions based on weather radar images.

2. Technical Background

Conventionally, rainfall.snowfall forecasting by weather radar has been performed on the basis of sampled radar weather images separated short time intervals, and estimating the future weather image by parallel translation of the changes in the two images. More specifically, the two radar images are analyzed to maximize the correlation coefficient between the two radar images, and future displacements of the weather elements are predicted by applying this value of the positional displacement to the translation of the weather elements in the entire image. The obtained value of the translation is applied to the current weather image up to several hours into the future to forecast the future radar weather images. The following references describe some examples of the conventional technique: Yoshio Asuma, Katsuhiro Kikuchi and Hisashi Kon, "Experiments for a Very-short-range Prediction of Snowfall Using a Simple Weather Radar System, Part 1. -Outline and Possibility-", Geophysical Bulletin of Hokkaido University, Sapporo, Japan, v. 44, October, pp35–51,1984; Yoshio Asuma, Katsuhiro Kikuchi and Hisashi Kon, "Experiments for a Very-short-range Prediction of Snowfall Using a Simple Weather Radar System, Part 2. -Examples of Actual Prediction-", Geophysical Bulletin of Hokkaido University, Sapporo, Japan, v. 44, October, pp53–65, 1984; Yoshio Asuma, Katsuhiro Kikuchi and Hisashi Kon, "A Method for Estimating the Advection Velocity of Radar Echoes Using a Simple Weather Radar System", Geophysical Bulletin of Hokkaido University, Sapporo, Japan, v. 44, October, pp23–34,1984.

However, because the conventional radar-based forecasting apparatus performs parallel translation as described above, the apparatus is unable to correct for the effects arising from the behaviors of the actual clouds, such as loss of image points, generation of new points, rotation of the images, non-uniform flow. To deal with such problems, it is possible to utilize fluid dynamics equations such as Navier-Stokes equation. However, it is rare in practice to be able to measure all the parameters required for solving the equation, and even if it was possible to measure all the required parameters, it is still an extremely time-consuming operation, and this approach is not effective in providing short time-range forecasting, for example, after several hours.

SUMMARY OF THE INVENTION

Therefore, the purpose of the present invention is to provide accurate future radar images from the present radar images obtained by weather radar, by considering actual physical properties related to cloud.

Therefore, the present invention presents an apparatus for forecasting a quantity of rainfall or snowfall in a specified region from reflection intensity images corresponding to cloud distribution conditions obtained from weather radar images, said apparatus comprising: input means for inputting reflection intensities from a plurality of lattice points defined on said reflection intensity images; memory means for memorizing the reflection intensities inputted by said input means; calculation means for multiplying the reflection intensities from a group of neighboring lattice points memorized in said memory means at a specific past time with a separate coefficient for each lattice point, summing the products of multiplication, transforming the values of the product of summation using a specific function based on cloud related properties to generate computational present data, and iterating until a specific predetermined threshold value is obtained so that the squared error of a difference between said computational present data and present data being observed presently becomes smaller than said threshold value; forecast means for predicting future reflection intensities for each lattice point of said group of neighboring lattice points at a future time, by summing products of the present reflection intensities and said coefficients generated by said calculation means to generate a product summation, and transforming said product summation using said specific function; decision means for determining the quantity of rainfall or snowfall in said specified region at said future time based on the reflection intensities predicted by said forecast means.

The present invention also presents a method for forecasting the quantity of rainfall or snowfall in a specified region from reflection intensity images corresponding to cloud distribution conditions obtained from weather radar images, said method comprising the steps of: inputting and memorizing reflection intensities from a plurality of lattice points defined on said reflection intensity images; multiplying reflection intensities memorized in memory means for each of a group of lattice points at a specific past time with a separate coefficient for each lattice point; summing the products of multiplication; transforming the values of the product of summation using a specific function based on cloud related properties to generate computational present data; iterating until a specific predetermined threshold value is obtained so that the squared error of a difference between the computational present data and the observed present data becomes smaller than said threshold value; predicting future reflection intensities for each lattice point of said group of lattice points at a future time, by summing products of the present reflection intensities and said coefficients generated by said calculation means to generate a product summation, and transforming said product summation using said specific function; and determining the quantity of rainfall or snowfall in said specified region at said future time based on the reflection intensities predicted by said forecast means.

According to the apparatus and the method presented above, it is possible to quickly and accurately predict future reflection intensities in a region at a specific time interval in the future, on the basis of the past reflection intensities sampled at the same specific time interval, the present reflection intensities and the computational present reflection intensities calculated from the past and present reflection intensities. Highspeed parallel computation is possible by providing a plurality of calculation sections to correspond with the plurality of lattice points in calculation means and forecast means.

PREFERRED EMBODIMENT

In the following, a preferred embodiment of the invention will be presented with reference to the drawings.

Figure 1:
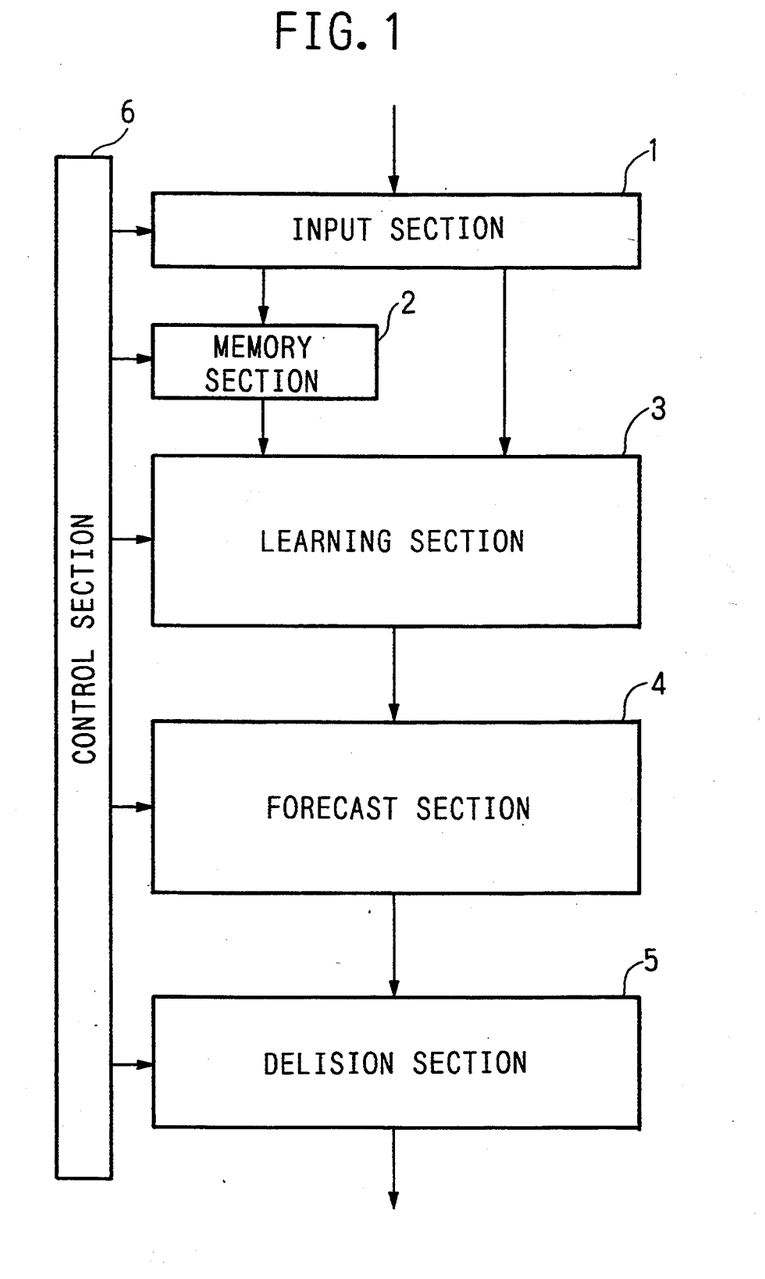
FIG. 1 is a block diagram showing the overall configuration of the rainfall.snowfall forecasting apparatus according to an embodiment of the present invention.

FIG. 1 is a block diagram of the apparatus of an embodiment of the rainfall.snowfall forecasting apparatus of the present invention.

In FIG. 1, the reference numeral 6 refers to the control section which controls the overall function of the apparatus, and each section comes under the control of this control section 6.

The input section 1 receives weather image data obtained by a weather radar (not shown) which samples the weather conditions at specific time intervals, and outputs the sampled weather data. The weather radar transmits ultrasonic signals and receives the reflected signals within a range of 340 Km diameter. The intensity of the reflected signals vary depending on the moisture contents in the atmosphere. Such a weather radar which is capable of detecting the moisture content in the atmosphere is known as a rainfall echo-radar.

The input section 1 draws square lattices at 1 Km intervals in a square area fitting over the circle of 340 Km diameter, and converts the weather image obtained from the weather radar into the reflection intensity data at all the lattice points of the radar image. The reflection intensities assume a value between 0 to 255. Because the reflection intensity is obtained only from the sampled weather image within the circular area, it should be noted that the reflection intensities from the area beyond the above circular area are all zero. Henceforth, the sampled image data will be referred to simply as image data.

The memory section 2 memorizes image data outputted from the input section 1 until the next sampling time.

The learning section 3 performs calculations necessary for forecasting rainfall.snowfall from the present observed image data and the previously sampled past image data.

The forecast section 4 predicts future image data several hours into the future based on the results of calculations by the learning section 3.

Next, the details of the learning section 3 and the forecast section 4 will be explained in detail.

Figure 2:
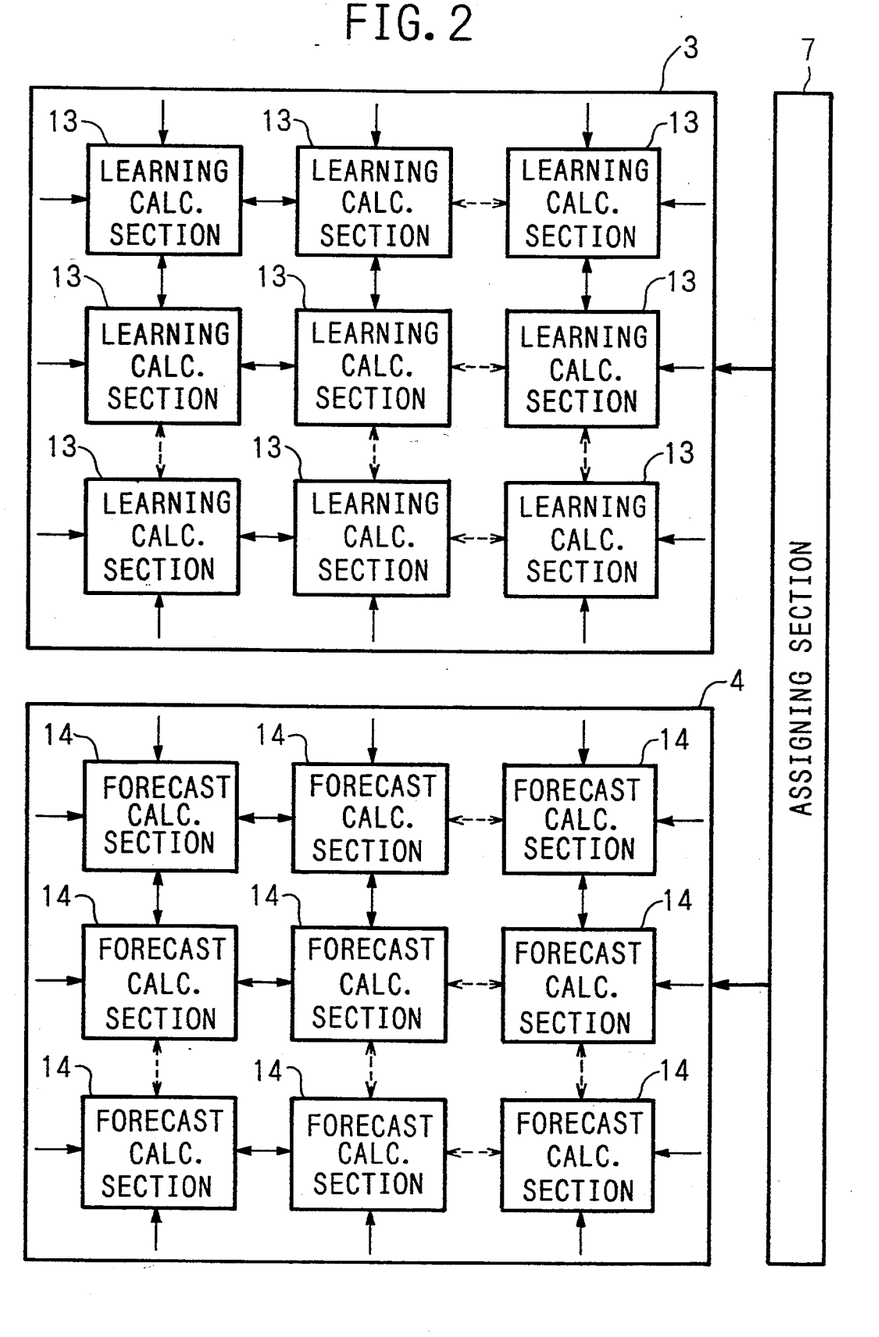
FIG. 2 is a block diagram showing the learning section having learning calculation parts and the forecast section having forecast calculation parts of the apparatus, and the assigning section for assigning calculation tasks.

Within the learning section 3, there are as many learning calculation sections 13 as there are the lattice intersection points. The assigning section 7 assigns the various learning calculation sections 13 to their respective lattice points in a two dimensional space.

Figure 3:
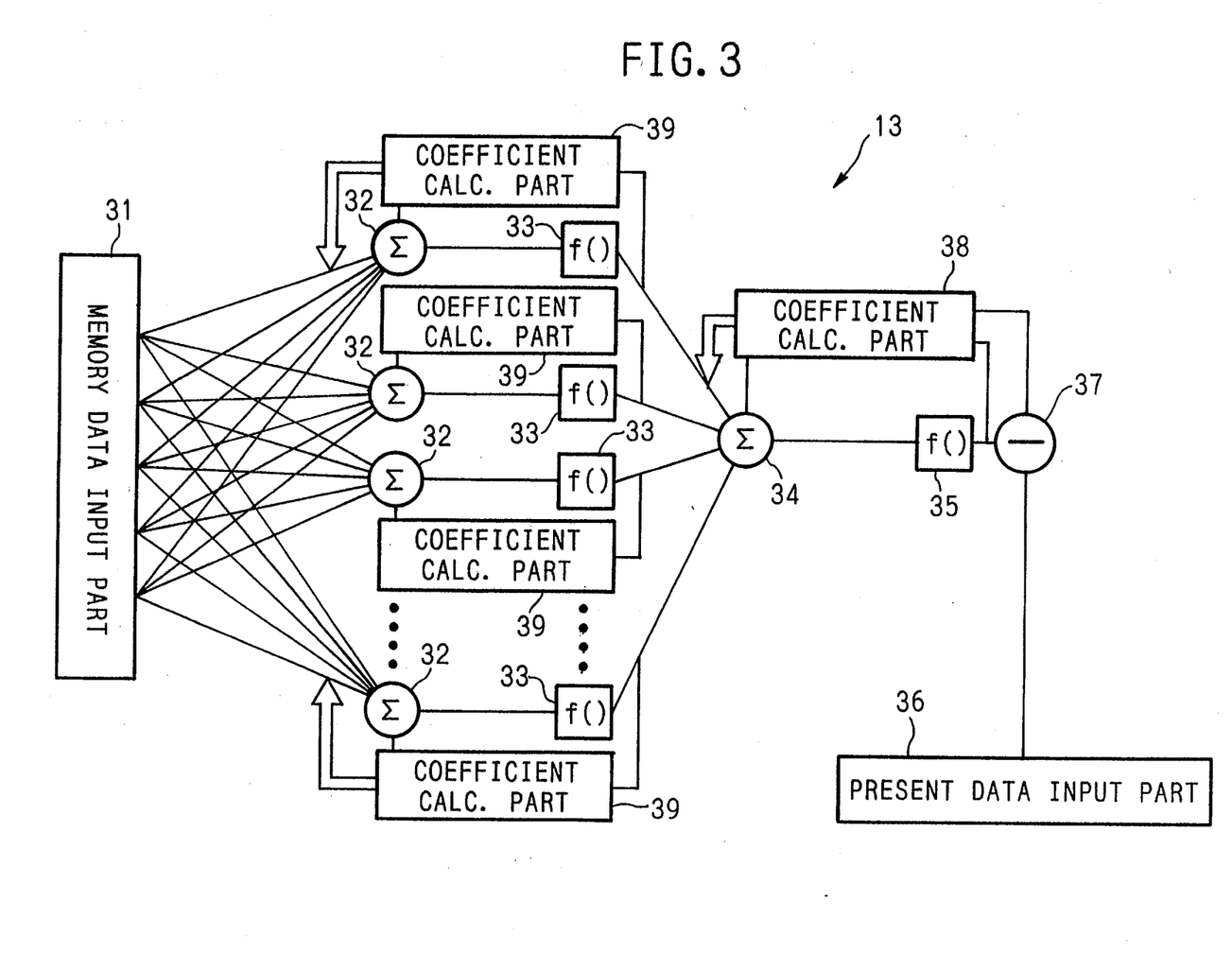
FIG. 3 shows the internal structure of the learning calculation section.

The internal structure of the learning calculation section 13 is shown in FIG. 3. The structure is derived basically from a neural network concept.

The memory data input part 31 of the memory data operates under the command of the control section 6 to receive past image data from the previous cycle corresponding to a lattice point and its neighboring points. In this embodiment, sampled data are from five lattice points consisting of the center point and the four orthogonal neighboring points thereabout.

The summation parts 32 are provided for a j number of parts. The value of j is determined in regard to the degree of precision required for the neural network calculations. The summation part 32 receives the input image data I(x, y, t−1) from five lattice points from the previous cycle inputted by the memory data input part 31 and multiplies it with a coefficient $W_{(x,y,\delta x,\delta y,j)}$ and sums the results over the five points. The function of the coefficient W will be explained later. A coefficient $\theta_j$ is added to the summation result and is outputted to part 33. The above calculation is represented in Equation (1).

$$\sum_{\delta x} \sum_{\delta y} \{W_{(x,y,\delta x,\delta y,j)} \cdot I(x + \delta x, y + \delta y, t - 1)\} + \theta_j \quad (1)$$

The function processing part 33 is for performing calculations for non-linear function f(x) which is provided for each of the summation part 32. The non-linear function f(x) describes non-linear physical properties related to clouds, and in this embodiment, the following equation is used as an example.

$$f(x) = 1/(1 + e^{-x}) \quad (2)$$

The function processing part 33 generates data h(x,y,t−1,j) represented by equation (3) shown below from equations (1) and (2).

$$h(x,y,t-1,j) = \quad (3)$$

$$f\left[\sum_{\delta x} \sum_{\delta y} \{W_{(x,y,\delta x,\delta y,j)} \cdot I(x + \delta x, y + \delta y, t - 1)\} + \theta_j\right]$$

The result from Equation (3) is forwarded to another product summation part 34, which multiplies the data from the function processing part 33 with a coefficient $\omega_j$ and sums the result. Another coefficient is added to the result as shown in Equation (4) below. This coefficient $\Phi$ will also be explained later.

$$\sum_j \omega_j \cdot h(x,y,t-1,j) + \phi \quad (4)$$

There is another function processing part 35 for computing the non-linear function f(x), similar to the function processing part 33, to provide computational present data I'(x,y,t) represented by the following equation (5).

$$I'(x,y,t) = f\left( \sum_j \omega_j \cdot h(x,y,t-1,j) + \phi \right) \quad (5)$$

The present data input part 36, under the command of the control section 6, receives image data at time t I(x,y,t) from the input section 1.

The numeral 37 is the decrementer, and output a difference data $\Delta I(x,y,t)$ shown by Equation (6) by subtracting I'(x,y,t) from I(x,y,t).

$$\Delta I(x,y,t) = I(x,y,t) - I'(x,y,t) \quad (6)$$

The coefficient calculation part 38 is for computing the values of the coefficient $\omega_j$ and $\Phi$ for every sampling time $\tau$, and computes image data, $\Delta I(x,y,t)$, from the output data from the decrementer 37, the output data I'(x,y,t), from the function processing part 35 and the output data, h(x,y,t−1,j), from each of the function processing part 33, based on the following equations (7) and (8). It should be mentioned in FIG. 3 that the data flow paths to the coefficient calculation part 38 from each of the function processing part 33 have been omitted.

$$d\omega_j/d\tau = -\Delta I(x,y,t) \cdot I'(x,y,t) \cdot (1-I'(x,y,t)) \cdot h(x,y,t-1,j) \quad (7)$$

$$d\Phi/d\tau = -\Delta I(x,y,t) \cdot I'(x,y,t) \cdot (1-I'(x,y,t)) \quad (8)$$

The values of the coefficients $\omega_j$ and $\Phi$ are periodically renewed in accordance with these equations.

The coefficient calculation part 39 is for computing the values of the coefficient $W_{(x, y, \delta x, \delta y, j)}$ and $\theta_j$ for every sampling time $\tau$, and computes image data, $\Delta I(x,y,t)$, from the output data from the decrementer 37, the output data, I'(x,y,t), from the function processing part 35 and the output data, h(x,y,t−1,j), from each of the function processing part 33, the coefficient $\omega_j$ outputted by the coefficient calculation part 38 and the output data, I(x,y,t−1), from the memory data input part 31 based on the following equations (9) and (10). It should be mentioned in FIG. 3 that the data flow paths to the function processing part 39 from each of the memory data input part 31, coefficient calculation part 38 and the function processing part 35 have been omitted.

$$dW_{(x, y, \delta x, \delta y, j)}/d\tau = -\Delta I(x,y,t) \cdot I'(x,y,t) \cdot (1-I'(x,y,t)) \cdot \omega_j h(x,y,t-1,j) \cdot (1-h(x,y,t-1,j)) \cdot I(x,y,t-1) \quad (9)$$

$$d\theta_j/d\tau = -\Delta I(x,y,t) \cdot I'(x,y,t) \cdot (1-I'(x,y,t)) \cdot \omega_j h(x,y,t-1,j) \cdot (1-h(x,y,t-1,j)) \quad (10)$$

The values of the coefficients $W_{(x, y, \delta x, \delta y, j)}$ and $\Phi$ are periodically renewed in accordance with these equations.

The learning calculation section 13 repeats the abovepresented series of calculations. The output data I'(x,y,t) from the function processing part 35 is the computational present data, obtained by the non-linear conversion of the past image data at (t−1) in accordance with the physical properties of the clouds. In other words, I'(x,y,t) is the computational present image data at time t based on the past image data at t−1. The deviation between the actual observed present data and the computational data can be defined in terms of the least squared error, err, represented by the following equation (11).

$$\text{err} = \int \int \{I(x,y,t) - I'(x,y,t)\}^2 \, dx \, dy \quad (11)$$

The above series of calculations are repeated by changing the values of the coefficients so as to gradually minimize the squared error in Equation (11). The control section 6 examines the results of (11), and terminates the processing in the learning calculation section 13 when the computed results becomes lower than a specific pre-determined threshold err value. The values of the coefficients at the threshold err value, $W_{(x,y,\delta x,\delta y,j)}$, $\theta_j$, $\omega_j$, $\Phi$ are taken as the determined final values of the computational present data and outputs them to the forecast section 4.

The forecast calculation sections 14 are provided for every lattice points in the forecast section 4, as in the case of the learning section 3. Similarly, the assigning section 7 assigns the various forecast calculation sections 14 to their respective lattice points in a two dimensional space.

Figure 4:
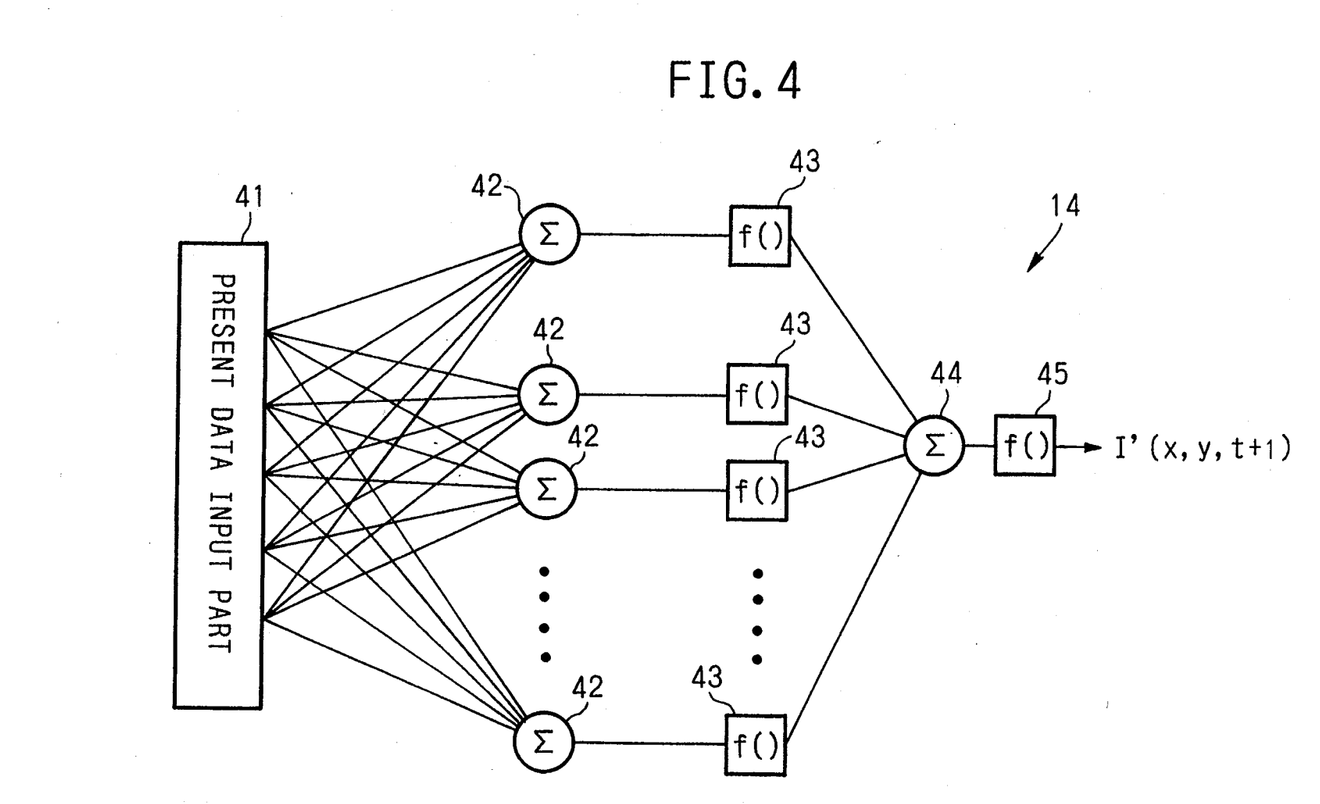
FIG. 4 shows the internal structure of the forecast calculation section.

The internal structure of the forecast calculation section 14 is shown in FIG. 4.

The present data input part 41, responding to the control section 6 commands, obtains the present image data I(x,y,t) at the present sampling time t for a lattice point and its neighboring lattice points from the corresponding learning calculation section 13. In this case also, as in the case of the learning calculation section 13, the five lattice points constitute the group of lattice point of interest and its four lattice points.

The summation parts 42 are provided for each of the j number of learning calculation sections 13. Based on the control section 6 commands, the determined values of the coefficients, $W_{(x, y, \delta x, \delta y, j)}$ and $\theta_j$, in the learning calculation section 13 are inputted into the summation part 42. Each part 42 calculates the product of the present observed image data I(x,y,t) for the five lattice points with the coefficient $W_{(x, y, \delta x, \delta y, j)}$ and sums the product, and adds the coefficient $\theta_j$. This process is similar to that performed in the learning calculation section 13, and is represented by the following equation (12).

$$\sum_{\delta x} \sum_{\delta y} \{W_{(x,y,\delta x,\delta y,j)} \cdot I(x + \delta x, y + \delta y, t)\} + \theta_j \quad (12)$$

The function processing part 43 performs non-linear calculations of the function f(x) shown in Equation (2) for each of the summation part 32. The result is expressed in the following Equation (13).

$$h(x,y,t,j) = f\left[\sum_{\delta x}\sum_{\delta y}\{W_{(x,y,\delta x,\delta y,j)} \cdot I(x + \delta x, y + \delta y, t)\} + \theta_j\right] \quad (13)$$

The another summation part 44, responding to the control section 6 commands, receives the coefficients $\omega_j$ and $\Phi$ determined in the learning calculation section 13 to correspond with the respective lattice points for the forecast calculation section 14. The summation part 44 multiplies the output data generated by Equation (13) with the coefficient $\omega_j$, sums the results, and adds the coefficient $\Phi$ to generate the data represented by the following Equation (14).

$$\sum_j \omega_j \cdot h(x,y,t,j) + \phi \quad (14)$$

The function processing part 45 is similar to the function processing part 43, and performs computational processing for the non-linear function f(x) shown in Equation (2) to generate the future data I'(x,y,t+1) represented by the following Equation (15).

$$I'(x,y,t+1) = f\left(\sum_j \omega_j \cdot h(x,y,t,j) + \phi\right) \quad (15)$$

The future data I'(x,y,t+1) is the computational future image data, obtained by the non-linear conversion of the observed present image data at t in accordance with the physical properties of the clouds. In other words, I'(x,y,t+1) is the predicted future image data at time t+1 based on the present computational data at t.

The function of the decision section 5 shown in FIG. 1 will be explained next. Under the command of the control section 6, the output data I'(x,y,t+1) from the forecast calculation section 14 is converted into rainfall.snowfall forecast value R, in units of mm/hr, at time t+1 according to the following Equation (16).

$$\log R(x,y,t+1) = (1/16)\{0.3125 \cdot I'(x,y,t+1) - 32.2475782\} \quad (16)$$

It should be mentioned that the rainfall.snowfall forecasting apparatus is provided with a display screen which displays image data showing the various forecast concentrations of R at the various lattice points.

The practical operation of the apparatus will be explained with reference to FIGS. 5 and 6.

Figure 5:
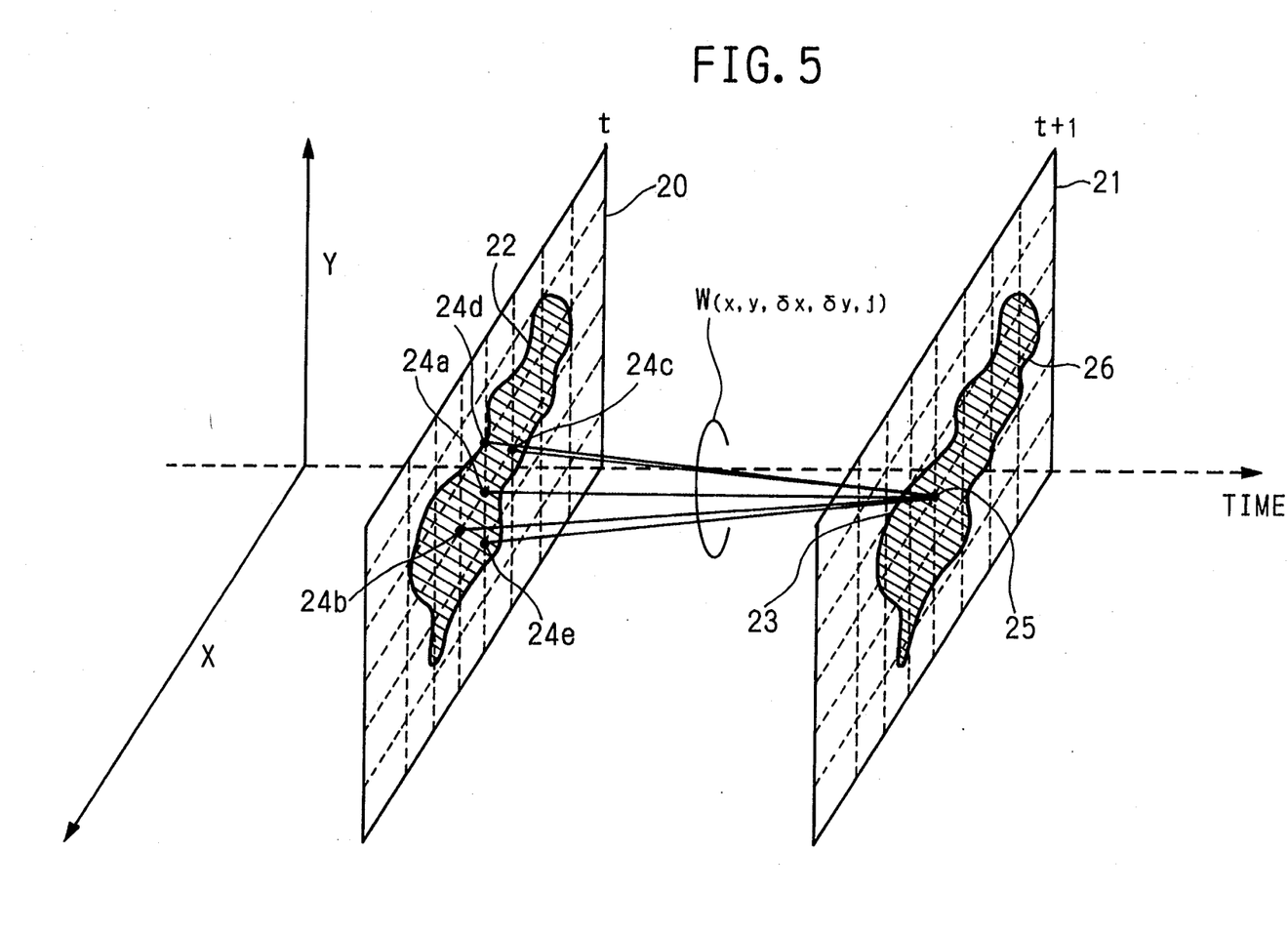
FIG. 5 is a schematic illustration of the relationship between a radar image at time t and a forecast image at time t+1.

FIG. 5 is a schematic illustration of the relationship between a present radar image 20 at time t and a forecast radar image 21 at time t+1. Each image exists in a two dimensional space defined by x and y axes. The dotted lines are drawn parallel to the x and y axes at a given spacing, and the intersection points are called the lattice points. The spacing between the lattice points represents 1 Km. For the sake of simplicity, the illustration shows only a part of the overall weather image data. When the time axis T is arranged as shown in the illustration, the positional relationship of the two images becomes as shown in FIG. 5. The shaded region 22 in the radar image 20) indicates those regions showing stronger reflections than the surrounding regions, and in actuality, indicates the region of clouds.

Figure 6:
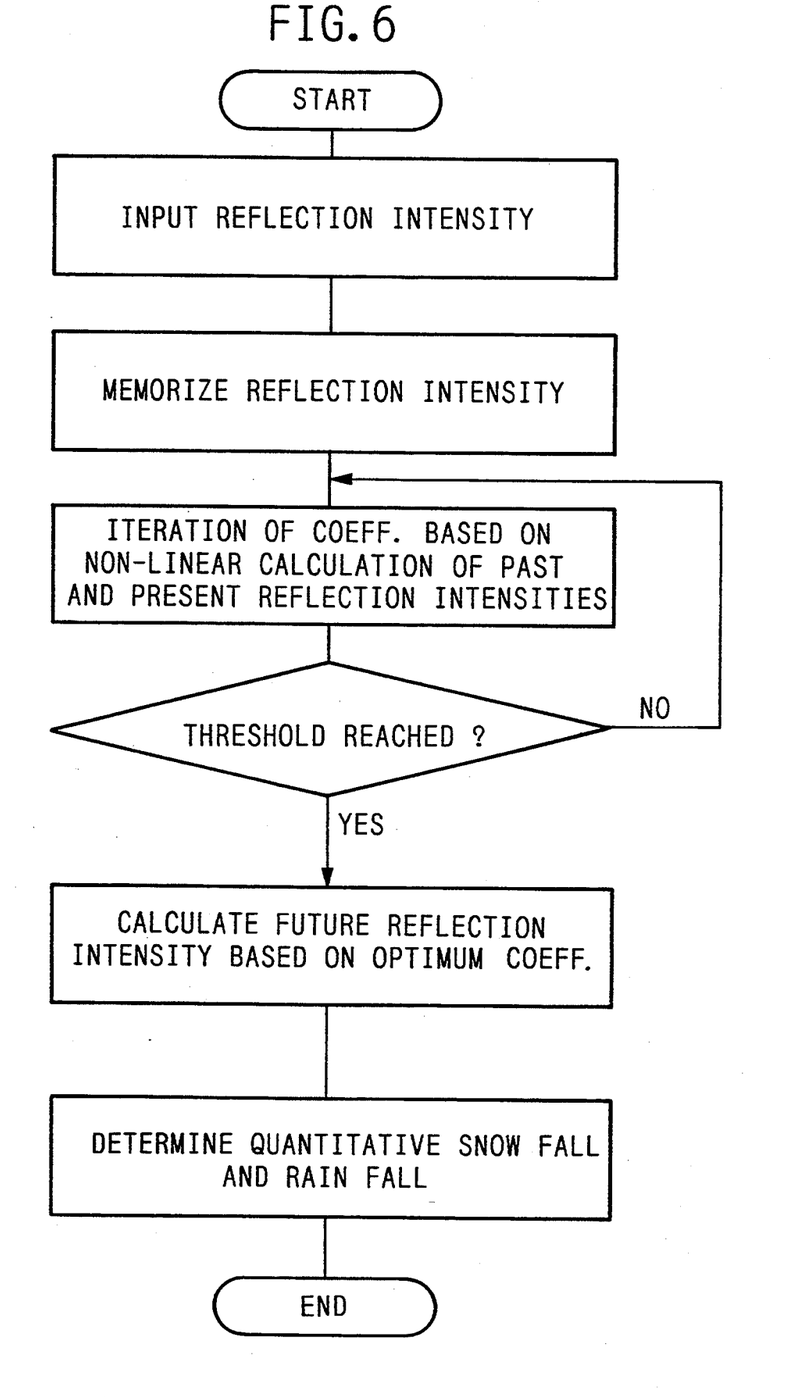
FIG. 6 is a flow chart showing the forecasting steps in the apparatus based on non-linear calculations.

FIG. 6 shows a flow chart for the forecast operation.

At time t, a radar image 20 from the weather radar is inputted into the input section 20 in accordance with the command from the control section 6, then the reflection intensities sampled by the input section 1 are stored in the memory section 2.

Taking an example case of a lattice point 24a (coordinates (x,y) are (4,3)) in a radar image 20, the reflection intensity I(4,3,t) at the lattice point 24a at time t is entered into the corresponding present data input part 36 in the learning calculation section 13. At the same time, in the memory data input part 31 of the learning calculation section 13 are inputted reflection intensities from the lattice points 24a~24e at the previous sampling time, t−1, from the memory section 2. These intensities correspond to I(4,3,t−1), I(5,3,t−1), I(3,3,t−1), I(4,4,t−1), and I(4,2,t−1).

In the learning calculation section 13, the iteration process takes place, under the command of the control section 6, so as to reach the predetermined threshold value of the squared error, err, by the iteration of the Equations (1), (3)~(10) by operating the production summation parts 32, function processing parts 33, product summation part 34, function processing part 35, decrementer 37, coefficient calculation part 38 and coefficient calculation part 39.

When the control section 6 decides that the squared error, err, has reached the threshold value, the values of the coefficients, $W_{(4,3,\delta x,\delta y, j)}$, $\theta_j$, $\omega_j$, and $\Phi$ are determined for the lattice point 24a. The values of the coefficients for the other lattice points are determined in the same manner.

Next, in accordance with the command from the control section 6, the various coefficients determined in the learning calculation section 13 for the lattice point 24a and the image data I(4,3,t), I(5,3,t), I(3,3,t), I(4,4,t), and I(4,2,t) for the lattice points 24a~24e at time t are inputted into the present data input part 41 in the forecast calculation section 14 for the lattice point 24a. The product summation part 42, function processing part 43, summation part 44 and the function processing part 45 perform computations for Equations (12)~(15).

The result is the forecast image data I'(4,3t+1) for the lattice point 24a at time t+1. This value represents the reflection intensity at the lattice point 25 on the radar image 21. Similarly, forecast image data I'(x,y,t+1) for the remaining lattice points are obtained, thus indicating the presence of the cloud at time t+1. In FIG. 5, the shaded region 26 indicates the region where the cloud may be expected.

Next, the future image data I'(x,y,t+1) determined by the forecast calculation section 14 is supplied to the decision section 5, which converts the image data to the quantity of forecast rainfall.snowfall R according to Equation (16), and the concentration image is shown on the display screen.

The above explanation was related to forecasting of the quantity of rainfall.snowfall at time t+1 based on the present data at time t. However, it is possible to forecast still further into the future, for example at time t+2, by regarding the future image data I'(x,y,t+1) as the present image data, and considering the present image data I(x,y,t) as the past data. Therefore, by repeating this process n times into the future point in time using two adjacent pair of image data at t and t+1, it becomes possible to forecast image data at time t+n.

Figure 7:
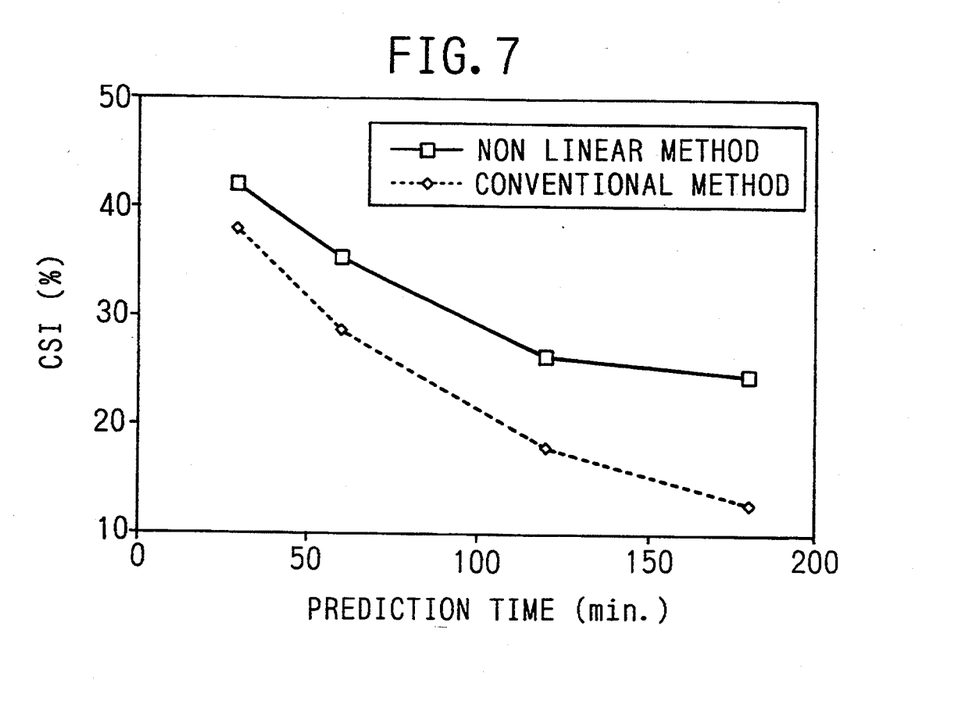
FIG. 7 is a comparison of forecasting capabilities based on the embodiment and the conventional apparatus.

This concept was validated using weather image data for a district centered about a city of Sapporo. Within a region of 340 Km square distance with center at Sapporo, lattices were drawn at 1 Km intervals on the weather image data. Based on two image data over the lattice points obtained at five minutes intervals, a future image data, five minutes into the future, was generated. By repeating the basic process described above, the rainfall.snowfall data in this district after 30, 60, 120 and 180 minutes into the future were generated. FIG. 7 shows the results of comparison of the performances of the apparatus according to the present invention with the conventional forecasting apparatus using the Critical Success Index (CSI) evaluation method. The CSI method calculates a percentage ratio of the overlapped area (of the predicted position of the cloud and the actual position of the cloud) to the overall areas of the two clouds, so that higher the value of CSI the higher the accuracy of prediction, i.e., 100% being a perfect agreement.

In FIG. 7, time is plotted on the horizontal axis, and the values of the CSI is plotted on the vertical axis, the solid line representing the evaluation results according to the method of the present invention, and the dotted line representing the evaluation results according to the conventional method. As seen in this figure, the accuracy of prediction is considerably higher for the present apparatus, and furthermore, with the passage of time the present apparatus shows less loss of prediction accuracy than the conventional apparatus.

Accordingly, it is possible to provide relatively accurate short range forecasting of rainfall.snowfall by successively predicting the movement of the cloud based on known physical properties of the cloud.

The forecasting apparatus utilized in the present embodiment performs high speed parallel computing by means of individual computers arranged in parallel; however, if the drop in speed is not a problem, regular computing units may be used instead of parallel computing.

Variation 1

In the above embodiment, a non-linear function, represented by Equation (2), was used, but it is also possible to generate similar forecasting by using a linear function as a method of approximation.

Figure 8:
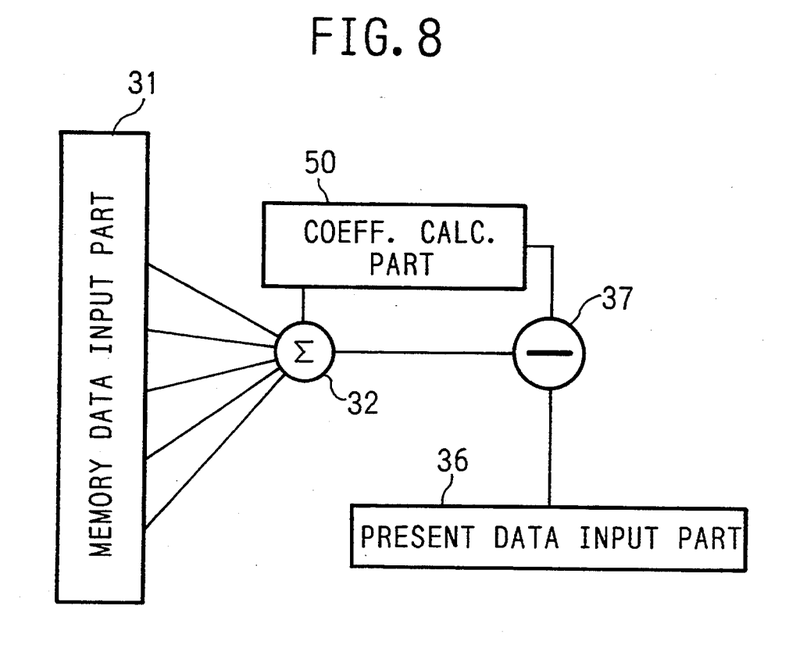
FIG. 8 shows the internal structure of a first variation of the learning calculation section in the first embodiment.

FIG. 8 shows a construction of the learning calculation section of such an apparatus. Those parts which are the same as in FIG. 3 will be referred to by the same numeral, and their explanations will be omitted.

As shown in FIG. 8, there is one summation part 32, which generates the computational present data I'(x,y,t), obtained by multiplying the past image data I(x,y,t−1) from five lattice points, at time t−1, with the coefficients $W_{(x,y,\delta x,\delta y)}$, as shown by the following Equation (17).

$$I'(x,y,t) = \sum_{\delta x} \sum_{\delta y} \{W_{(x,y,\delta x,\delta y)} \cdot I(x + \delta x, y + \delta y, t - 1)\} \quad (17)$$

The coefficient calculation part 50 iterates the value of $W_{(x,y,\delta x,\delta y)}$ according to Equation (18) for the data obtained by subtracting the value of Equation (17) from the present data I(x,y,t) inputted by the present data input part 36, and $\tau$ is the sampling time for coefficient W.

$$dW_{(x, y, \delta x, \delta y)}/d\tau = I(x,y,t) - I'(x,y,t) \quad (18)$$

The above data I'(x,y,t) is the data obtained by a linear approximation of the past image data at time t−1 in accordance with the physical properties of the cloud, and as in the previous embodiment, this data represents the computational present data.

In this case, the control section 6 commands the learning calculation section to iterate the coefficient W according to the following Equation (19) until the squared error of the difference between the data I(x,y,t) and the data I'(x,y,t) becomes smaller than a predetermined threshold value.

$$(1/2) \sum_x \sum_y \{I(x,y,t) - I'(x,y,t)\}^2 \quad (19)$$

When the above value becomes less than the threshold value, the determined value of $W_{(x,y,\delta x,\delta y)}$ is supplied to the forecast calculation section.

Figure 9:
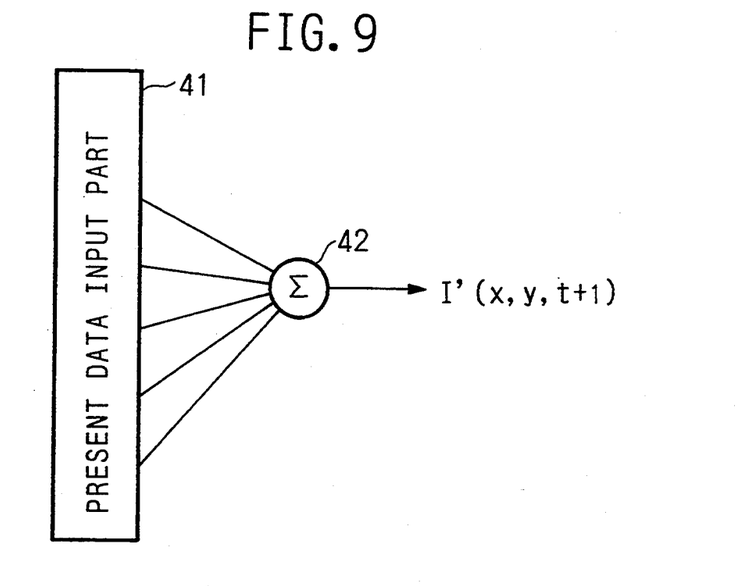
FIG. 9 shows the internal structure of the first variation of the forecast calculation section in the first embodiment.

FIG. 9 shows the construction of the forecast calculation section in this variation case. In FIG. 9, those parts which are the same as those in FIG. 4 are given the same reference numeral, and their explanations are omitted.

As shown in FIG. 9, there is only one product summation part 42 in addition to the present data input part 41, which performs forecast image generation in accordance with the following Equation (20).

$$I'(x,y,t + 1) = \sum_{\delta x} \sum_{\delta y} W_{(x,y,\delta x,\delta y)} \cdot I(x + \delta x, y + \delta y, t) \quad (20)$$

Figure 10:
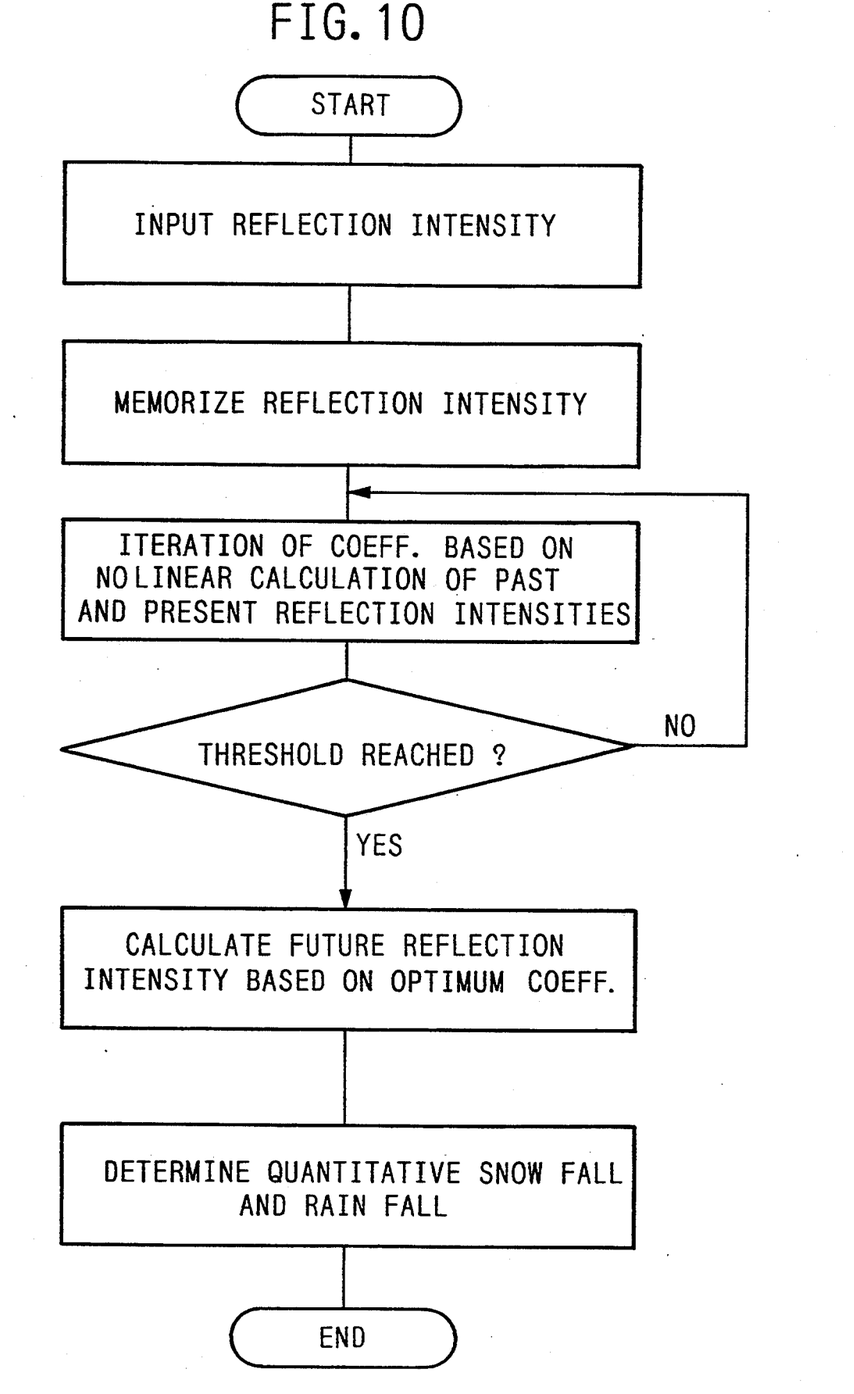
FIG. 10 is a flow chart showing the forecasting steps in the apparatus based on the first variation of the embodiment.

FIG. 10 shows a flow chart for the above processing, and, except for substituting a linear function for the non-linear function, this flow chart is the same as that in FIG. 6. Compared with the non-linear representation, the linear approximation is slightly lower in accuracy, but the advantages are its simple structure and the quick processing speed.

Variation 2

This variation of the basic embodiment retains the simple and quick processing of the first variation, but provides an improved accuracy of prediction.

The loss of accuracy in the linear approximation is related to the fact that there are many possible combinations of the coefficient W to satisfy the predetermined threshold value in Equation (19), and therefore, it is necessary to narrow the combination to those which improve the prediction accuracy. In this variation, a limitation is imposed by utilizing the fact that the time-dependency of the reflection intensity is related to the sum of linear approximations of dispersion, translation, sink and source of cloud.

The above linear sum is expressed by the following Equation (21).

$$dI(x,y,t)/dt = \alpha(x,y) \cdot \nabla^2 I(x,y,t) + \beta(x,y) \cdot \nabla I(x,y,t) + \gamma(x,y) \cdot I(x,y,t)) + \epsilon(x,y) \quad (21)$$

When Equation (21) is expanded to the reflection intensities from the neighboring lattice points by the difference method, the sum of their coefficients in the orthogonal directions becomes zero. When this condition is applied to the linear processing, the coefficient W must satisfy the following Equation (22).

$$W_{(x,y,\delta x,0)} + W_{(x,y,-\delta x,0)} - (W_{(x,y,0,\delta y)} + W_{(x,y,0,-\delta y)}) = 0 \quad (22)$$

The above equation is added as a new condition for determining the threshold value to the processing routine.

Figure 11:
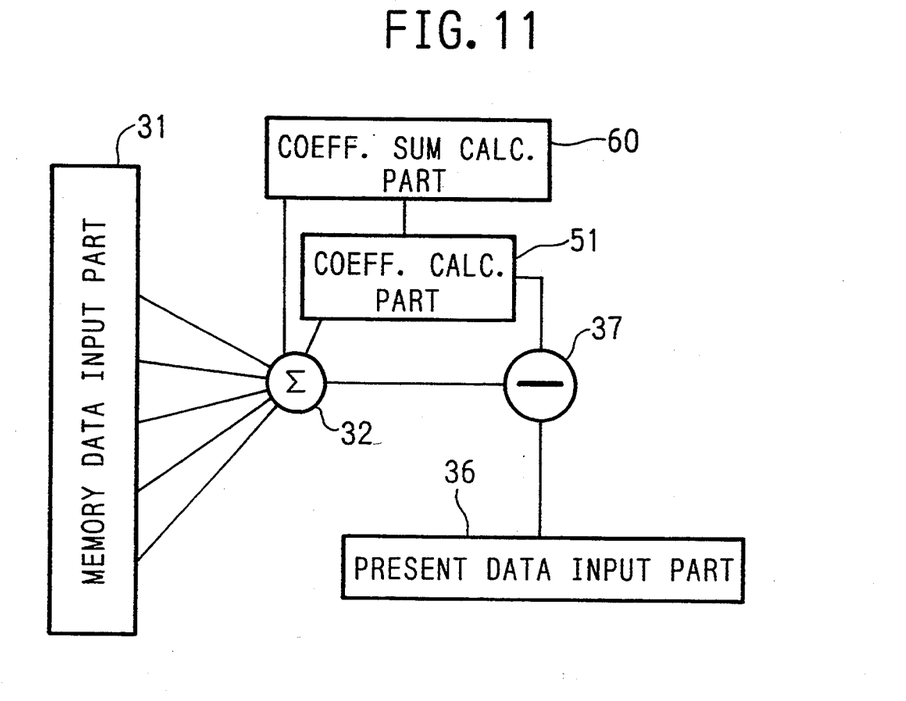
FIG. 11 shows the internal structure of a second variation of the learning calculation section in the embodiment.

FIG. 11 shows the structure of the learning calculation section in this variation 2. In FIG. 11, the same parts as those in FIG. 8 are given the same reference numeral, and their explanations are omitted.

In FIG. 11, the coefficient sum calculation part 60, performs the calculation of the diffusion of the reflection coefficient $\eta$ according to the following Equation (23).

$$\eta = \lambda \cdot (W_{(x,y,\delta x,0)} + W_{(x,y,-\delta x,0)} - (W_{(x,y,0,\delta y)} + W_{(x,y,0,-\delta y)})) \quad (23)$$

where $\lambda$ is a specific constant, and the diffusion coefficient $\eta$ represents a harmonization of the neighboring coefficients. The smaller this value the better the harmonization of image data for the neighboring lattice points.

The coefficient calculation part 51 iterates the coefficient $W_{(x,y,\delta x,\delta y)}$ by taking account of the diffusion coefficient $\eta$ outputted by the coefficient sum calculation part 60 according to Equation (24).

$$dW_{(x,y,\delta x,\delta y)}/d\tau = I(x,y,t) - I'(x,y,t) - \eta \quad (24)$$

The structure of the forecast calculation section is the same as that shown in FIG. 9.

Figure 12:
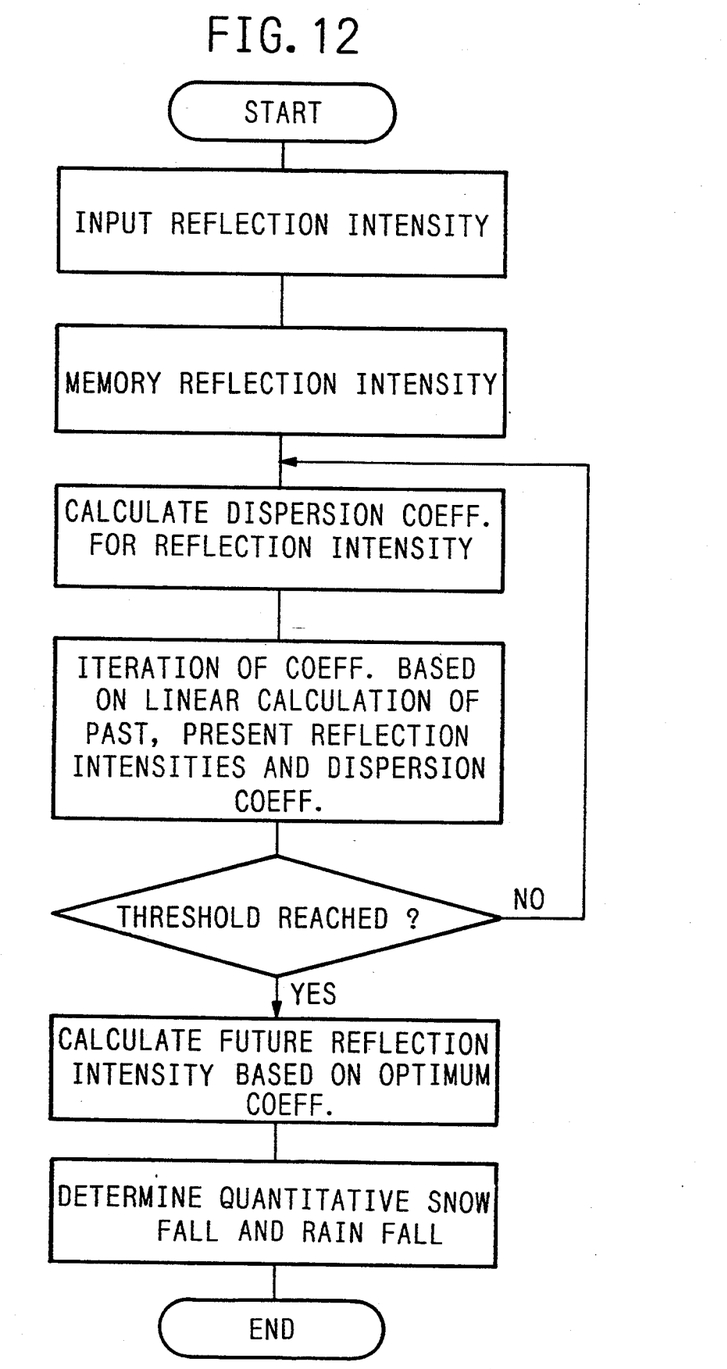
FIG. 12 is a flow chart showing the forecasting steps in the apparatus based on the second variation of the embodiment.

FIG. 12 is a flowchart showing the process steps in variation 2, but it is the same as that shown in FIG. 10, except for the addition of harmonization of the coefficients as presented above. By undertaking this procedure, it becomes possible to obtain almost the same degree of accuracy by linear processing as that achievable by the non-linear processing.

Therefore, because the rainfall.snowfall forecasting apparatus of the present invention is capable of forecasting short time-range rainfall or snowfall conditions in a region, it would be a particularly useful support for planning purposes, for example, for snow removal in the heavy snowfall regions.

In the above embodiment, predictions were made on the basis of the reflection intensity data from every lattice point. However, it is also possible to improve the accuracy of forecasting by including other weather data, such as atmospheric pressures and temperatures, in the calculation.

What is claimed is:

1. An apparatus for forecasting a quantity of rainfall or snowfall in a specified region from reflection intensity images corresponding to cloud distribution conditions obtained from weather radar images, said apparatus comprising:
   (a) input means for inputting reflection intensities from a plurality of lattice points defined on said reflection intensity images;
   (b) memory means for memorizing the reflection intensities inputted by said input means;
   (c) calculation means for multiplying the reflection intensities from a group of neighboring lattice points memorized in said memory means at a specific past time with a separate coefficient for each lattice point, summing the products of multiplication, transforming the values of the product of summation using a specific function based on cloud related properties to generate computational present data, and iterating until a specific predetermined threshold value is obtained so that the squared error of a difference between said computational present data and present data being observed presently becomes smaller than said threshold value;
   (d) forecast means for predicting future reflection intensities for each lattice point of said group of neighboring lattice points at a future time, by summing products of the present reflection intensities and said coefficients generated by said calculation means to generate a product summation, and transforming said product summation using said specific function;
   (e) decision means for determining the quantity of rainfall or snowfall in said specified region at said future time based on the reflection intensities predicted by said forecast means.

2. An apparatus as claimed in claim 1, wherein said apparatus performs parallel computations by having a plurality of calculation sections, in said calculation means, to correspond with each of said lattice points; assigning means for assigning a calculation section to each of said lattice points; and parallel calculation means for performing parallel computations by using said calculation sections assigned by said assigning means.

3. An apparatus as claimed in claim 1, wherein said apparatus performs parallel computations by having a plurality of calculation sections, in said forecast means, to correspond with each of said lattice points; assigning means for assigning a calculation section to each of said lattice points; and parallel calculation means for performing parallel computations by using said calculation sections assigned by said assigning means.

4. An apparatus as claimed in claim 1, wherein said specific function is a non-linear function cloud related properties.

5. An apparatus as claimed in claim 1, wherein said specific function is a linear function approximating properties of cloud.

6. An apparatus as claimed in claim 1, wherein said apparatus is provided with means for calculating parameters expressing harmonization of said coefficients based on cloud related properties of dispersion, translation, sink and source.

7. A method for forecasting the quantity of rainfall or snowfall in a specified region from reflection intensity images corresponding to cloud distribution conditions obtained from weather radar images, said method comprising the steps of:
   (a) inputting and memorizing reflection intensities from a plurality of lattice points defined on said reflection intensity images;
   (b) multiplying reflection intensities memorized in memory means for each of a group of lattice points at a specific past time with a separate coefficient for each lattice point;
   (c) summing the products of multiplication;
   (d) transforming the values of the product of summation using a specific function based on cloud related properties to generate computational present data;
   (e) iterating until a specific predetermined threshold value is obtained so that the squared error of a difference between the computational present data and the observed present data becomes smaller than said threshold value;

(f) predicting future reflection intensities for each lattice point of said group of lattice points at a future time, by summing products of the present reflection intensities and said coefficients generated by said calculation means to generate a product summation, and transforming said product summation using said specific function; and (g) determining the quantity of rainfall or snowfall in said specified region at said future time based on the reflection intensities predicted by said forecast means.

8. A method as claimed in claim 7, wherein said specific function is a non-linear function based on cloud related properties.

9. A method as claimed in claim 7, wherein said specific function is a linear function approximating properties of cloud.

10. A method as claimed in claim 7, wherein said method includes a step of calculating parameters expressing harmonization of said coefficients based on cloud related properties of dispersion, translation, sink and source.

* * * * *